Figure 1:
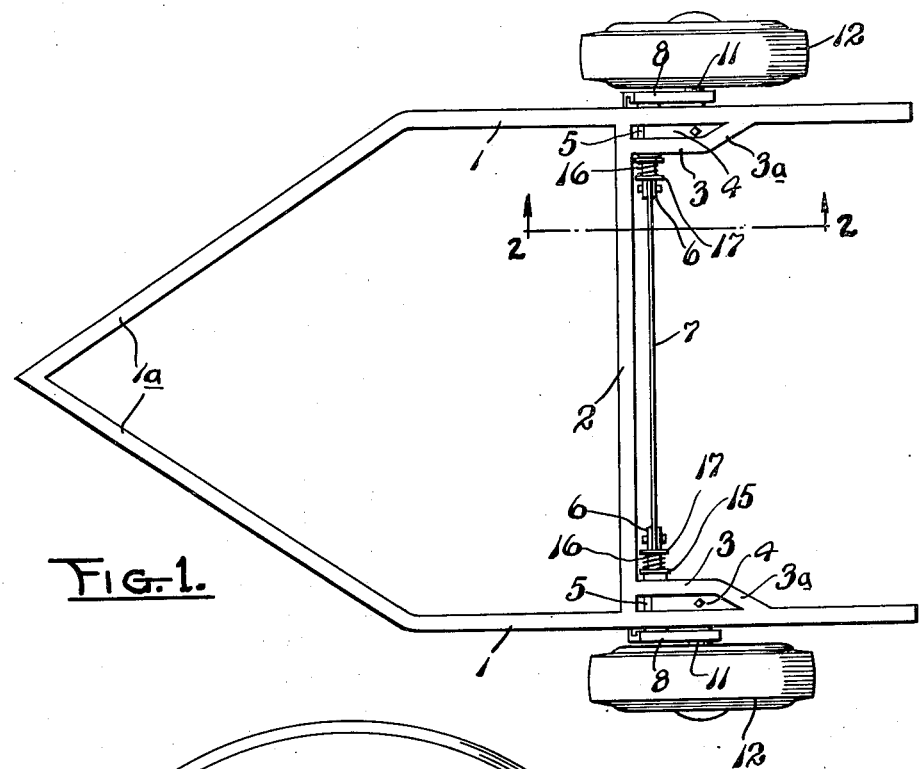

March 28, 1950 — M. D. SULLIVAN — 2,501,974
TRAILER SUSPENSION UNIT
Filed June 28, 1948 — 2 Sheets-Sheet 1

INVENTOR
MATHEW D. SULLIVAN
ATTORNEYS

March 28, 1950 M. D. SULLIVAN 2,501,974
TRAILER SUSPENSION UNIT
Filed June 28, 1948 2 Sheets-Sheet 2
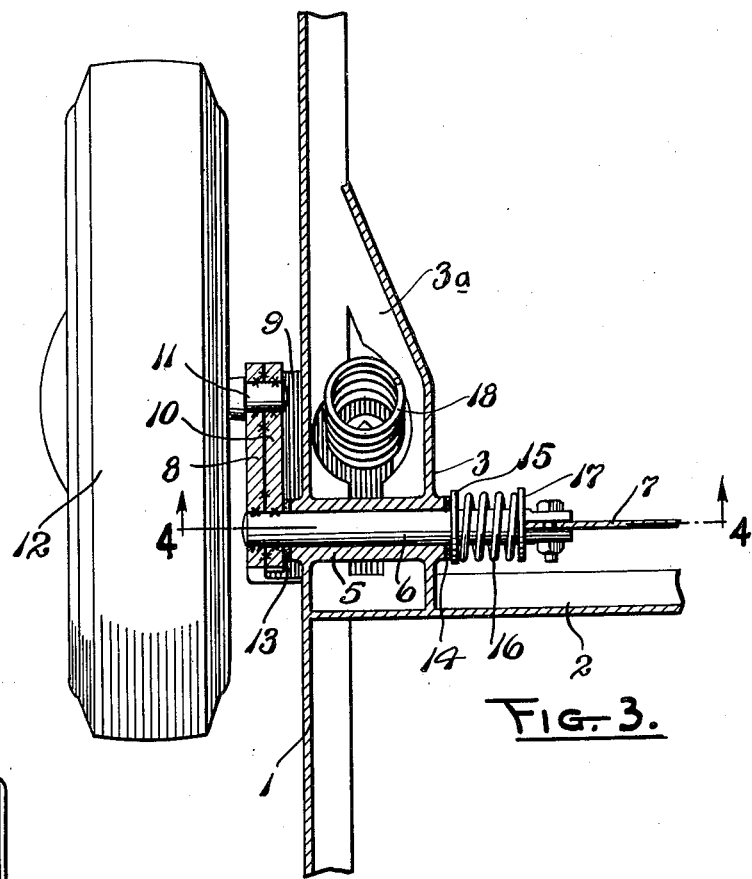
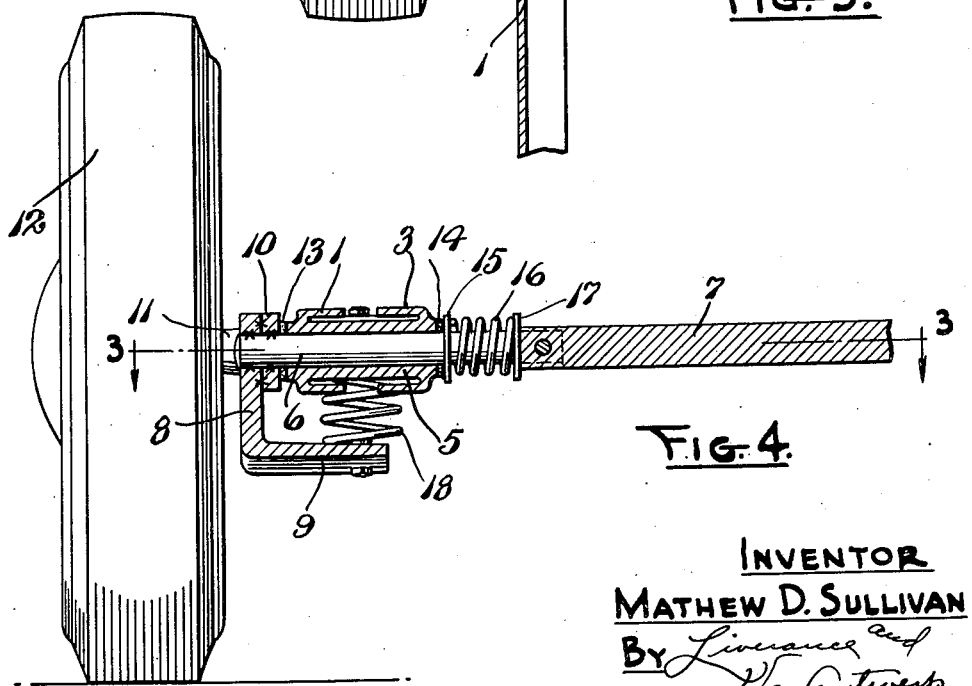
INVENTOR
MATHEW D. SULLIVAN
BY
ATTORNEYS

UNITED STATES PATENT OFFICE 2,501,974

TRAILER SUSPENSION UNIT

Mathew D. Sullivan, Flint, Mich.

Application June 28, 1948, Serial No. 35,659

5 Claims. (Cl. 280—104)

This invention relates to a trailer suspension structure which, while very useful in connection with trailers which are drawn at the backs of motor vehicles, is not necessarily restricted in use to the one use named, but may be of a more general application.

In the drawing of trailers over the road, and in many other types of vehicles, the wheels which carry such vehicles are subjected to differing conditions in accordance with the varying conditions of the road and should have an independence in movement as much as possible. But if each wheel is made wholly independent in its mounting upon a frame with which it is connected, the stability of the vehicle is detrimentally affected.

It is an object and purpose of the present invention to provide a practical, simple, novel and very useful wheel mounting and connection, and with a very practical and useful spring suspension thereof in which each of the wheels at one side of a trailer frame, or other vehicle frame, has a large measure of independence of movement with reference to the opposite wheel which is used, and yet is interconnected by a yielding connection which is of sufficient resistance such that the stability of the frame or any superstructure mounted thereon is substantially maintained. The elimination of undue stresses and strains upon the connecting parts between wheels is obtained and a particularly serviceable spring suspension unit for trailer frames and other vehicle frames is provided.

Figure 2:
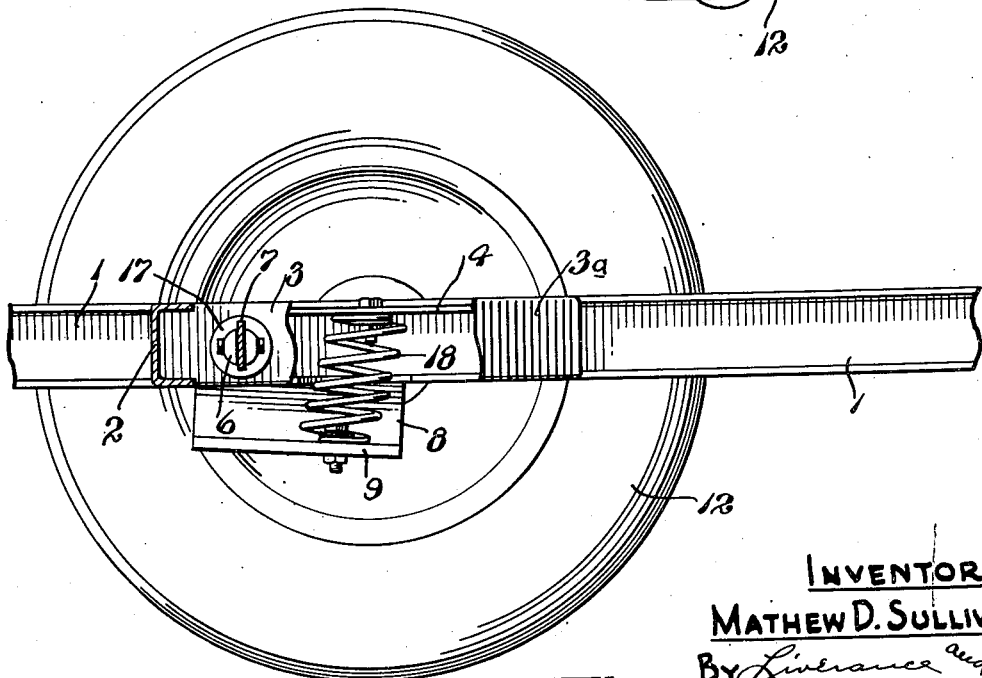

An understanding of the invention may be had from the following description, taken in connection with the accompanying drawings in which:

Fig. 1 is a plan view of an embodiment of my invention showing it applied to a trailer frame, Fig. 2 is a fragmentary enlarged vertical section, substantially on the plane of line 2—2 of Fig. 1, Fig. 3 is a fragmentary horizontal section substantially on the plane of line 3—3 of Fig. 4, and Fig. 4 is a fragmentary vertical section substantially on the plane of line 4—4 of Fig. 1.

Like reference characters refer to like parts in the different figures of the drawings, and the sections are taken looking in the directions indicated by the arrows.

In the embodiment shown a chassis frame having two spaced apart chassis side frame members 1, which in use are located generally horizontal, may have their forward portions 1a converge and meet and be permanently connected together. Of course, the specific detail of the frame structure so far as the chassis side frame members may be concerned is not essential to this invention. Adjacent the places on the frame where the wheels are to be located, a horizontal crossbar 2 is provided, being welded at its ends to the opposite side frame members 1. The chassis members 1 and the crossbar 2, preferably, are of a rolled channel form. From the rear side of the crossbar 2 toward each end of the bar, and spaced inwardly a short distance from each of the side frame members 1, a short channel bar 3 is located and welded at its front end to the bar 2, extending rearwardly therefrom a short distance, and then extending rearwardly and outwardly as at 3a, being welded at its rear end to the adjacent side frame member 1. A plate 4 extends between the upper flanges of the chassis side frame members 1 and the bars 3 and their annular extensions 3a. It is permanently secured in place by welding or other permanent connection and bridges the gap between said upper flanges of said members 1 and 3 and may extend forward nearly to the crossbar 2.

A sleeve or bushing 5 is passed through the webs of the channel chassis frame members 1 and the adjacent bars 3 and is welded in place, becoming a permanent part of the frame structure. A short shaft 6 passes through each of the sleeve bushings 5 projecting beyond each end thereof. At the inner end of each of the shafts 6, it is diametrically slotted and a flat bar 7 of spring material connects the inner ends of the two short shafts 6, the ends of the flat bar 7 being received in the slots, and bolts or other equivalent connections used. In general it is desirable that the connections be those which may be disconnected, such as bolts and nuts, for any repair or replacement of parts. At the outer projecting end of each of the shafts 6 an angle member is permanently secured. It includes a vertical leg 8 and an integrally extending generally horizontal leg 9. At the inner side of the leg 8 and at its upper portion a bar 10 is welded or otherwise permanently secured. The associated shaft 6 at its outer end passes through the front end portion of the bar 10 and the like front end portion of the vertical web 8. A wheel carrying a spindle 11 is permanently secured at the rear end portions of said bar 10 and web 8 on which a wheel 12 is mounted for turning.

Between each of the bars 10 and the outer end of the sleeve bushing 5 a felt washer 13 is located for retaining lubricant within the bushing around the shaft. A similar washer 14 is located around the shaft 6 at the inner end of each bushing 5 for the same purpose, against which is a metal washer 15. A coiled compression spring 16 is around each of the shafts 6 at its inner end portion, and bears at one end against the washer 15. At its other or inner end, it is against a like washer 17 which is pressed by the spring against the adjacent end of the flat spring bar 7. A heavy coiled compression spring 18 is located between the rear end portions of the upper plate 4 and over the lower horizontal leg 9 below it. The ends of the spring may be connected by bolts to said plate and leg as shown.

Each of the shafts 6 is turnable independently about its axis of turning and each one may be turned or rotated to a greater extent than the other to which it is connected by bar 7 in the same direction, or they may rotate in opposite directions. In either case the flat spring bar 7 is twisted or subjected to a longitudinal torsional strain. Said bar 7, which is of a good quality of spring steel, resists such torsional strain, but yields to the stress applied to it when it is greater than such resistance. Thus if one wheel should strike an obstruction in the road and rebound therefrom, its associated spring 18 first being heavily compressed and then elongated rapidly while the opposite wheel remains in frictional engagement with the road, it is evident that the bar 7 connecting the two shafts 6 will be torsionally distorted and will resist such distortion in accordance with its strength of resistance, thereby controlling the wheel which may have bounced upwardly so as to be out of contact with the road and holding it against excess movement to which it would have been subjected if the shaft 6 with which it is connected was entirely free to turn about its axis under the force supplied by the associated spring 18. But such yielding connection between the two short shafts 6 allows a much greater freedom of action of either wheel connected to the outer ends of the shafts 6, and with a maintenance of stability approaching that which would be provided by a solid shaft taking the place of the two short shafts 6 and the connecting bar 7 between them.

It is of course to be understood that by lengthening the horizontal leg 9 and the frame members 3a, and correspondingly lengthening the plates 4, more than a single spring 18 may be used with each wheel.

The invention in use has proved very practical and useful and serves the purpose for which it was designed in an exceptionally satisfactory manner. The claims appended hereto define the invention, which is to be considered comprehensive of all forms of structure coming within their scope.

I claim:

1. In a structure as described, a generally horizontal chassis frame having spaced parallel chassis side frame members, a horizontal sleeve permanently secured on and transversely of each of said chassis side frame members, said sleeves being located in axial alignment, a short shaft extending through each sleeve and free for rocking movement therein, a flat bar of spring material extending between said shafts and connected at its ends to the inner ends of the shafts, an L-shaped member having a generally vertical flange and a generally horizontal inwardly extending flange at the lower end of the vertical flange at the outer end of each shaft, means connecting the outer end of each shaft to the vertical flange of its associated member adjacent an upper corner thereof, a wheel carrying spindle connected with the vertical flange of each of said members adjacent its opposite upper corner, a wheel on each spindle, and a coiled compression spring disposed between the frame and said inwardly extending flange for yieldingly resisting rotative movement of said member and attached wheel about the axis of its associated shaft.

2. A structure as defined in claim 1, and a lubricant retaining washer around each shaft between the outer end of each of said sleeves and the adjacent flange of its associated member, a second lubricant retaining washer around each of said shafts at the inner end of its associated sleeve, and spring means mounted on each shaft at the inner end portion thereof to yieldingly press the last mentioned washer against the inner end of its associated sleeve.

3. In a structure as described, a frame including two spaced apart generally horizontally chassis side frame members, a transverse crossbar connecting said side frame members, a short frame member spaced inwardly from each of the side frame members permanently connected at one end to said crossbar and extending therefrom parallel to its associated side frame member for a distance and then outwardly to said side frame member and permanently connected thereto, a horizontal plate secured to and extending between the upper portions of each chassis side frame member, and a horizontal sleeve extending through each chassis side frame member and associated short frame member, said sleeves being in horizontal alignment, a short shaft extending through each sleeve and free for rocking movement therein, a bar connecting the inner ends of said shafts and extending between them, said bar yieldingly resisting torsional strain, an L-shaped member having a vertical flange and an inwardly extending horizontal flange secured at the inner end of each shaft at the upper front corner portion of the vertical flange thereof, said horizontal flange extending under said horizontal plate, a coiled compression spring between said horizontal flange and said plate, a wheel carrying axle permanently secured to said horizontal flange at its rear upper corner portion, and a wheel rotatably mounted on said spindle.

4. A structure as defined in claim 3, said horizontal flange at its inner side and upper portion having a horizontal bar located thereagainst and permanently secured thereto, the associated shaft and wheel spindle having permanent connection to both said bar and vertical flange of the associated member.

5. A structure as defined in claim 4, a washer around the shaft between said horizontal bar and the outer end of each sleeve, a second washer around the shaft at the inner end of each sleeve, said washer being of fabric material, a metal washer around each shaft lying against said second mentioned fabric washer, a coiled spring around the shaft having one end bearing against said metal washer, and a second metal washer around each shaft against which the other end of the spring engages, said second metal washer bearing against the adjacent end of said connecting bar between the shafts.

MATHEW D. SULLIVAN.

REFERENCES CITED

The following references are of record in the file of this patent:

UNITED STATES PATENTS

| Number | Name | Date |
|---|---|---|
| 1,137,720 | Anderson | Apr. 27, 1915 |
| 2,002,402 | Konopka | May 21, 1935 |
| 2,090,141 | Newton | Aug. 17, 1937 |
| 2,164,602 | Valletta | July 4, 1939 |
| 2,166,774 | Tjaarda | July 18, 1939 |

FOREIGN PATENTS

| Number | Country | Date |
|---|---|---|
| 798,613 | France | Mar. 10, 1936 |